United States Patent
Chen et al.

(10) Patent No.: US 9,669,540 B2
(45) Date of Patent: Jun. 6, 2017

(54) COLLAPSIBLE STAND

(71) Applicant: Rexon Industrial Corp., Ltd., Taichung (TW)

(72) Inventors: Jia-Xiang Chen, Taichung (TW); Wen-Chin Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 8 days.

(21) Appl. No.: 15/012,951

(22) Filed: Feb. 2, 2016

(65) Prior Publication Data
US 2016/0223130 A1 Aug. 4, 2016

(30) Foreign Application Priority Data
Feb. 3, 2015 (TW) .............................. 104103555 A (51) Int. Cl.
*B25H 1/04* (2006.01)
*A47B 3/091* (2006.01)
(Continued)

(52) U.S. Cl.
CPC ................ *B25H 1/04* (2013.01); *A47B 3/02* (2013.01); *A47B 3/0818* (2013.01); *A47B 3/0917* (2013.01); *A47B 3/0918* (2013.01); *B25H 1/00* (2013.01); *B25H 1/0021* (2013.01); *B25H 1/0042* (2013.01); *B25H 1/02* (2013.01); *B25H 1/06* (2013.01); *B62B 1/00* (2013.01); *B62B 1/208* (2013.01); *F16M 3/00* (2013.01); *F16M 11/38* (2013.01); *B62B 2205/06* (2013.01)

(58) Field of Classification Search
CPC ...... B25H 1/00; B25H 1/0021; B25H 1/0042; B25H 1/02; B25H 1/04; B25H 1/06; B62B 1/208; B62B 1/00; F16M 11/38; A47B 3/02; A47B 3/0818; A47B 3/0917; A47B 3/0918
USPC ................................ 248/588, 595, 439, 676
See application file for complete search history.

(56) References Cited

U.S. PATENT DOCUMENTS

| 1,718,962 A | * | 7/1929 | Kimball | .................... B62B 1/12 |
| | | | | 280/14 |
| 4,040,585 A | * | 8/1977 | Socas | ..................... A47B 37/02 |
| | | | | 248/371 |

(Continued)

FOREIGN PATENT DOCUMENTS

| DE | EP 0446623 B1 | * | 9/1994 | ............... A47B 3/02 |
| EP | 0326505 B1 | * | 12/1993 | ............... B23Q 9/00 |

(Continued)

*Primary Examiner* — Eret McNichols
(74) *Attorney, Agent, or Firm* — Bacon & Thomas, PLLC (57) ABSTRACT

A collapsible stand includes a carrying member, a first support frame unit and a second support frame unit respectively pivotally connected to the carrying member, a linking unit pivotally connected between the first and second support frame units for allowing the collapsible stand to be alternatively set between an extended position and a collapsed position, and a locking unit for locking the first and second support frame units to the carrying member selectively in the extended or collapsed position. The overall structure of the collapsible stand is simple and easy to operate. When set in the extended position, the first and second support frame units give a large area support to the carrying member, assuring high stability.

7 Claims, 7 Drawing Sheets (51) Int. Cl.
*B25H 1/02* (2006.01)
*A47B 3/02* (2006.01)
*B25H 1/00* (2006.01)
*F16M 11/38* (2006.01)
*B62B 1/20* (2006.01)
*B25H 1/06* (2006.01)
*B62B 1/00* (2006.01)
*A47B 3/08* (2006.01)
*F16M 3/00* (2006.01)

(56) References Cited

U.S. PATENT DOCUMENTS

| | | | | |
|---|---|---|---|---|
| 4,253,546 A * | 3/1981 | Uchida | ............... | B62B 1/12 182/20 |
| 4,278,243 A * | 7/1981 | Alessio | ............... | B25H 1/04 269/139 |
| 5,560,582 A | 10/1996 | Beelen | | |
| 6,942,229 B2 | 9/2005 | Brazell et al. | | |
| 7,077,421 B2 * | 7/2006 | Wu | ............... | B25H 1/04 280/30 |
| 7,487,947 B2 * | 2/2009 | Liu | ............... | B25H 1/04 248/284.1 |
| 7,588,255 B2 * | 9/2009 | Katz | ............... | A47B 3/08 280/47.18 |
| 7,681,893 B2 * | 3/2010 | Liu | ............... | B25H 1/04 280/35 |
| 7,690,408 B2 * | 4/2010 | Sugiura | ............... | B25H 1/04 144/286.5 |
| 8,047,553 B2 * | 11/2011 | Voong | ............... | B25H 1/04 248/129 |
| 8,313,076 B2 * | 11/2012 | Tam | ............... | B25H 1/04 248/128 |
| 9,149,926 B2 * | 10/2015 | Chen | ............... | B25H 1/04 |
| 9,156,486 B2 * | 10/2015 | Liu | ............... | B62B 1/12 |
| 9,186,736 B1 * | 11/2015 | Chang | ............... | B23D 57/0092 |
| 9,533,410 B2 * | 1/2017 | Chiang | ............... | B25H 1/0042 |
| 2005/0212236 A1 * | 9/2005 | Tiramani | ............... | B25H 1/04 280/47.18 |
| 2006/0076756 A1 * | 4/2006 | Wu | ............... | B25H 1/04 280/652 |
| 2008/0203704 A1 * | 8/2008 | McCracken | ............... | B25H 1/06 280/651 |
| 2012/0313351 A1 * | 12/2012 | Chen | ............... | B25H 1/04 280/652 |
| 2016/0223130 A1 * | 8/2016 | Chen | ............... | B25H 1/04 |
| 2016/0250745 A1 * | 9/2016 | Lifshitz | ............... | F16M 11/04 |

FOREIGN PATENT DOCUMENTS

| | | | | |
|---|---|---|---|---|
| VG | CA 2620463 C * | 11/2015 | ............... | B25B 5/08 |
| WO | WO 2006073996 A1 * | 7/2006 | ............... | B25H 1/04 |
| WO | WO 2015110116 A1 * | 7/2015 | ............... | B62B 1/12 |

* cited by examiner

COLLAPSIBLE STAND

BACKGROUND OF THE INVENTION

1. Field of the Invention

The present invention relates to supporting vehicles, and more particularly to a collapsible stand for supporting vehicle.

2. Description of the Related Art

In order to facilitate delivery between different workplaces, machine tool stands for regular small-scale machine tools commonly have a folding design so that the stands can be alternatively set between an extended position and a collapsed position.

Collapsible stand exemplars are seen in U.S. Pat. No. 6,942,229 and U.S. Pat. No. 5,560,582. These two prior art designs commonly include a carrying platform, a first leg pivotally connected to one side of the carrying platform, a pair of second legs pivotally connected to an opposite side of the carrying platform and pivotally coupled with the first leg in a crossed manner. Subject to the design that the first leg and the second legs are biasable relative to the carrying platform, the collapsible stand can be conveniently collapsed.

The aforesaid prior art collapsible stands can be used for supporting a bench-top power tool and alternatively set between an extended position and a collapsed position. However, according the design of U.S. Pat. No. 6,942,229, a sliding guide must be provided in the carrying platform, and a roller must be mounted at the top end of one leg and slidably coupled to the sliding guide. According to the design of U.S. Pat. No. 5,560,582, gas springs are interposed between legs of the stand to counterbalance the weight of the threading machine during displacement of the stand between the folded and unfolded positions thereof. The arrangement of the gas springs complicates the structure of the stand, relatively increasing the cost. Further, because the first and second legs are arranged in a crossed manner, increasing the support area of the lower ends of the first and second legs will relatively lower the elevation of the carrying platform. In order to obtain sufficient support, the elevation of the carrying platform will be unable to satisfy the requirement.

SUMMARY OF THE INVENTION

The present invention has been accomplished under the circumstances in view. It is therefore the main object of the present invention to provide a collapsible stand, which has a simple structure, provides a large area support, and assures high stability.

To achieve this and other objects of the present invention, a collapsible stand comprises a carrying member, a first support frame unit, a second support frame unit, a linking unit, and a locking unit. The carrying member comprises a first lateral portion and an opposing second lateral portion. The first support frame unit comprises a first pivot-connection portion pivotally connected to the carrying member adjacent to the first lateral portion, a first interlocking portion located at one side of the first pivot-connection portion, and a first end piece portion located at an opposite side of the first pivot-connection portion opposite to the first interlocking portion. The second support frame unit comprises a second pivot-connection portion pivotally connected to the carrying member adjacent to the second lateral portion, a second interlocking portion located at one side of the second pivot-connection portion, and a second end piece portion located at an opposite side of the second pivot-connection portion opposite to the second interlocking portion. The linking unit is pivotally connected between the first interlocking portion of the first support frame unit and the second interlocking portion of the second support frame unit. The locking unit is mounted at the carrying member, and adapted for locking the first support frame unit and the second support frame unit to the carrying member. The first support frame unit is operable to move the collapsible stand between an extended position and a collapsed position. When operating the first support frame unit to move the collapsible stand from the collapsed position to the extended position, the linking unit is forced to move the second support frame unit away from the carrying member to the extended position where the first end piece portion and the second end piece portion are kept far away from each other, and the locking unit is operable to lock the first support frame unit and the second support frame unit to the carrying member in the extended position. When operating the first support frame unit to move the collapsible stand from the extended position to the collapsed position, the linking unit is forced to move the second support frame unit toward the carrying member to the collapsed position where the first end piece portion and the second end piece portion are kept in proximity to each other, and the locking unit is operable to lock the first support frame unit and the second support frame unit to the carrying member in the collapsed position.

The invention has the effects that: utilizing the feature that the first support frame unit and the second support frame unit are biasable relative to the carrying member and the feature that the linking unit is pivotally connected between the first support frame unit and the second support frame unit, a chain reaction occurs between the first support frame unit and the second support frame unit when the user collapses or extends out the collapsible stand. Thus, the overall structure of the collapsible stand is simple, facilitating operation. When the collapsible stand is held in the extended position, the first and second support frame units provide a large area support to the carrying member, assuring high stability.

Other advantages and features of the present invention will be fully understood by reference to the following specification in conjunction with the accompanying drawings, in which like reference signs denote like components of structure.

DETAILED DESCRIPTION OF THE INVENTION

Figure 1:
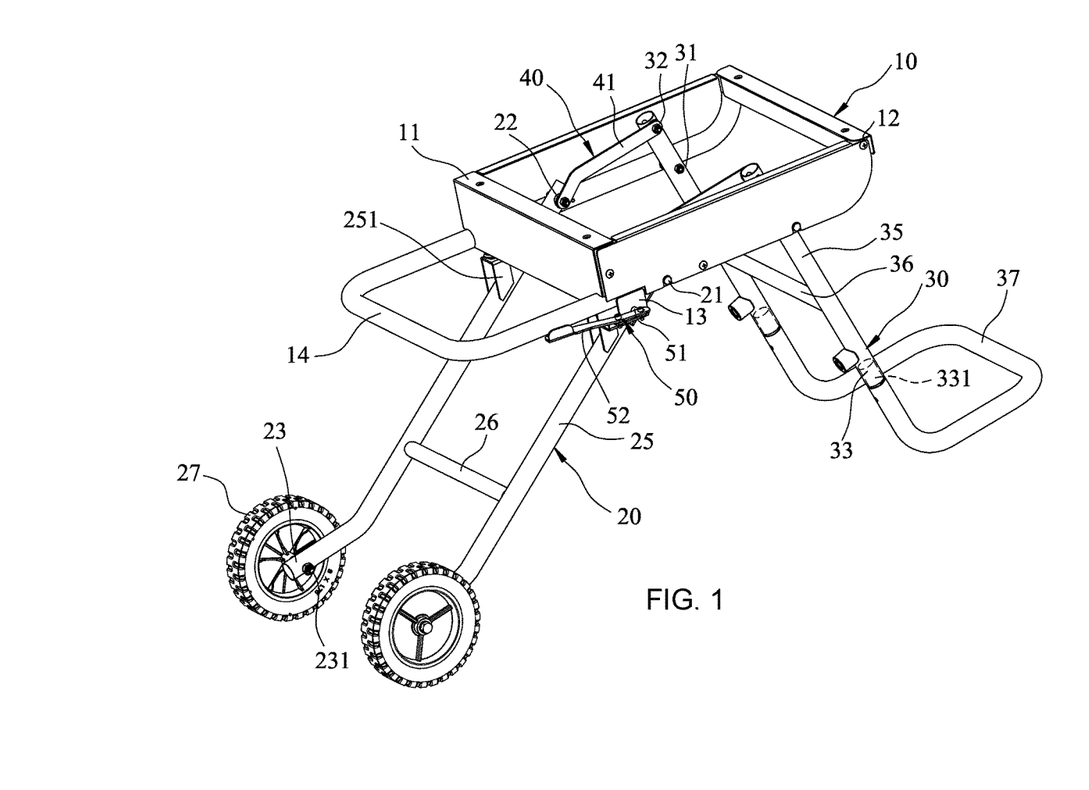
FIG. 1 is an oblique top elevational view of a collapsible stand in accordance with the present invention.
Figure 2:
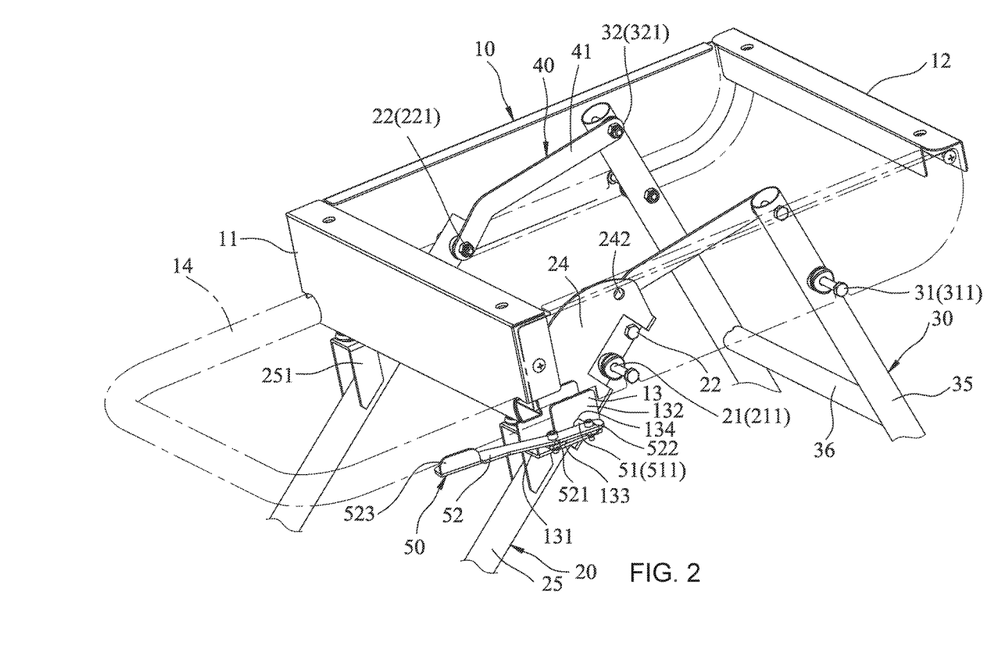
FIG. 2 is a schematic perspective view of a part of the collapsible stand in accordance with the present invention.

Referring to FIGS. 1 and 2, a collapsible stand in accordance with the present invention is shown. As illustrated, the collapsible stand comprises a carrying member 10, a first support frame unit 20, a second support frame unit 30, a linking unit 40, and a locking unit 50.

Figure 3:
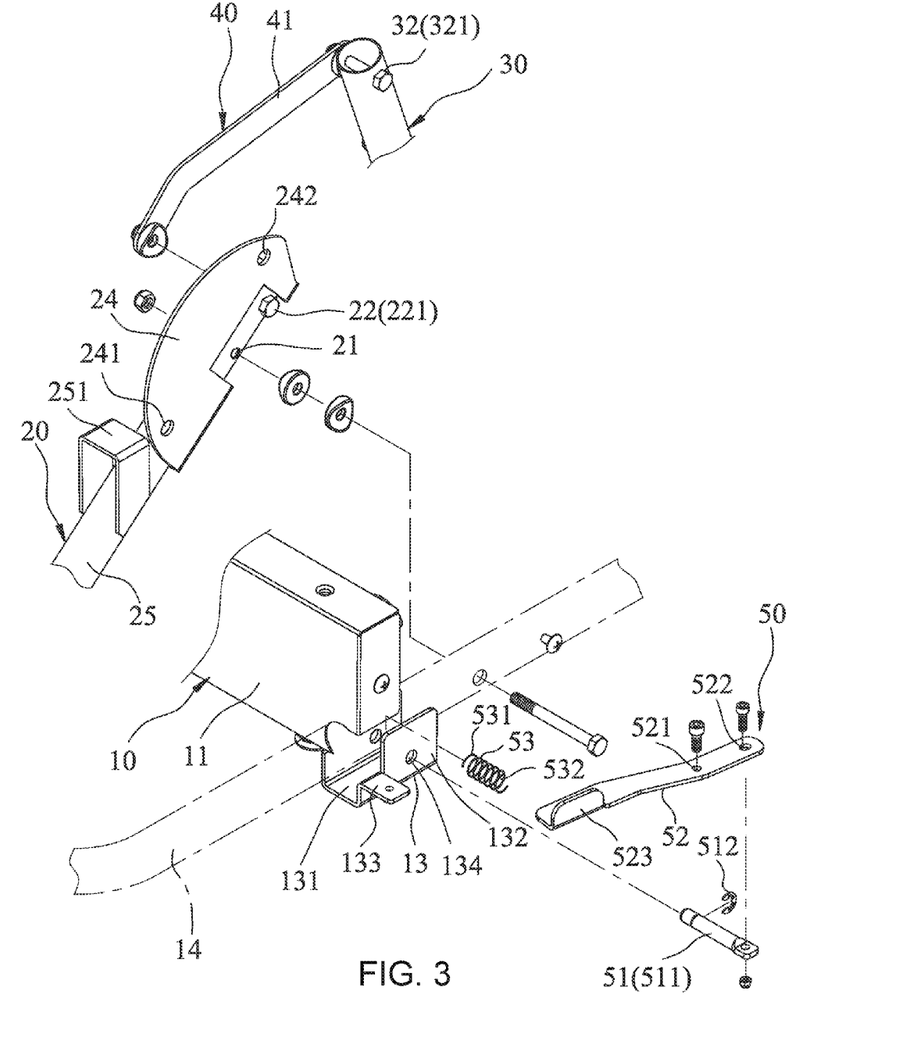
FIG. 3 is an exploded view of a part of the collapsible stand in accordance with the present invention, illustrating the relationship between the locking unit and the first support frame unit.
Figure 5:
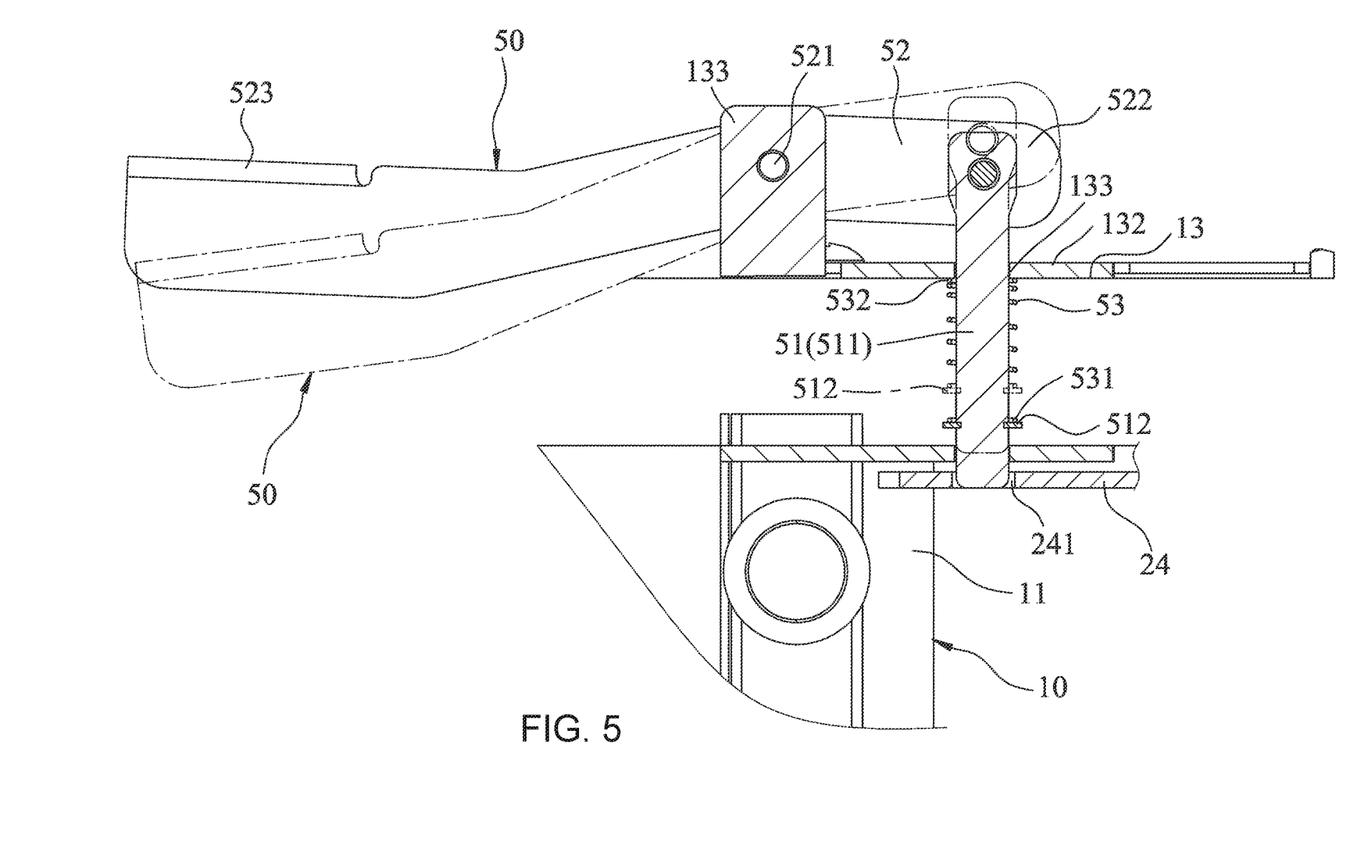
FIG. 5 is a sectional view taken along line IV-IV of FIG. 3.

The carrying member 10 is a rectangular frame adapted for the mounting of a small scale machine tool (such as table saw, not shown), the carrying member 10 comprising a first lateral portion 11, a second lateral portion 12 opposite to the first lateral portion 11, a mount 13 located at the first lateral portion 11, and a handlebar 14 connected to the first lateral portion 11. Referring also to FIG. 3 and FIG. 5, the mount 13 is disposed at a bottom side relative to the handlebar 14, comprising a bottom panel 131, two side panels 132 respectively and vertically extended from two opposite lateral sides of the bottom panel 131, a lug 133 connected to one side panel 132, and two pivot holes 134 respectively located at the side panels 132 and correspondingly aligned with each other.

The first support frame unit 20 comprises a first pivot-connection portion 21 pivotally connected to the carrying member 10 in proximity to the first lateral portion 11, a first interlocking portion 22 disposed at one lateral side relative to the first pivot-connection portion 21, a first end piece portion 23 disposed at an opposite lateral side relative to the first pivot-connection portion 21 and opposite to the first interlocking portion 22, an engagement plate 24 fixedly connected to one side of the first pivot-connection portion 21, a pair of first frame bars 25 extended from the first pivot-connection portion 21 to the first end piece portion 23, a first cross bar 26 connected between the two first frame bars 25, and a pair of wheels 27 respectively pivotally connected to respective bottom ends of the first frame bars 25.

The first pivot-connection portion 21 comprises a pair of first pivot bolts 211 respectively connected to respective opposing top ends of the first frame bars 25.

The first interlocking portion 22 comprises a pair of first interlocking bolts 221 respectively disposed at the top ends of the first frame bars 25 and respectively located adjacent to the first pivot bolts 211 of the first pivot-connection portion 21.

The first end piece portion 23 comprises a pair of first wheel axles 231 disposed opposite to the first interlocking bolts 221 at an opposite side relative to the first pivot bolts 211. The wheels 27 are respectively pivotally mounted on the first wheel axles 231.

Referring also to FIG. 3 and FIG. 5, the engagement plate 24 is a smoothly arched plate fixedly mounted at one first frame bar 25 to face toward the mount 13, comprising a first retaining hole 241 and a second retaining hole 242 respectively located at two opposite laterals of the first pivot-connection portion 21. Further, the second retaining hole 242 is disposed corresponding to the first interlocking portion 22.

The first frame bars 25 each comprise a stop block 251 disposed between the first pivot bolts 211 and the first wheel axles 231. The stop blocks 251 are respectively disposed relatively closer to the first pivot bolts 211.

The second support frame unit 30 comprises a second pivot-connection portion 31 pivotally connected to the carrying member 10 in proximity to the second lateral portion 12, a second interlocking portion 32 located at one lateral side of the second pivot-connection portion 31, a second end piece portion 33 located at an opposite lateral side of the second pivot-connection portion 31 opposite to the second interlocking portion 32, a pair of second frame bars 35 extended from the second pivot-connection portion 31 to the second end piece portion 33, a second cross bar 36 connected between the two second frame bars 35, and an inverted-U-shaped bottom frame bar 37 connected between the second frame bars 35.

The second pivot-connection portion 31 comprises a pair of second pivot bolts 311 respectively connected to the second frame bars 35.

The second interlocking portion 32 comprises a pair of second interlocking bolts 321 respectively connected to the second pivot bolts 311 of the second pivot-connection portion 32.

The second end piece portion 33 comprises a pair of connection end holes 331 disposed opposite to the second interlocking bolts 321 at an opposite side relative to the second pivot bolts 311. The The inverted-U-shaped bottom frame bar 37 has two opposite ends thereof respectively connected to the connection end holes 331 of the second end piece portion 33.

The linking unit 40 comprises a pair of links 41 respectively pivotally connected between the first interlocking portion 22 of the first support frame unit 20 and the second interlocking portion 32 of the second support frame unit 30. These links 41 are respectively pivotally connected between the first interlocking bolts 221 and the second interlocking bolts 321.

The locking unit 50 is mounted at the mount 13 of the carrying member 10, and adapted for locking the first support frame unit 20 and the second support frame unit 30 to the carrying member 10. The locking unit 50 can also be mounted at said first support frame unit 20 or said second support frame unit 30. Referring also to FIG. 3 and FIG. 5, the locking unit 50 comprises a locking member 51 slidable relative to the carrying member 10, an operating bar 52 pivotally connected to the lug 133, and a spring member 53 mounted on the locking member 51. The locking member 51 comprises a pin 511 inserted into the pivot holes 134 of the side panels 132, and a retainer ring 512 fastened to the pin 511. The retainer ring 512 is disposed between the side panels 132. The operating bar 52 comprises a body portion 521 pivotally connected to the lug 133 of the mount 13, a connection end portion 522 located at one end of the body portion 521 and pivotally connectable to the pin 511 of the locking member 51, and an operating end portion 523 located at an opposite end of the body portion 521 and disposed opposite to the connection end portion 522. The operating end portion 523 is disposed in proximity to the handlebar 14. The spring member 53 in this embodiment is a compression spring disposed between the side panels 132, having an elastic restoring end portion 531 located at one end thereof and stopped against the retainer ring 512 and an opposing abutment end portion 532 located at an opposite end thereof and stopped against one side panel 132. The elastic restoring energy of the spring member 53 constantly forces the pin 511 of the locking member 51 to move toward the engagement plate 24.

Figure 4:
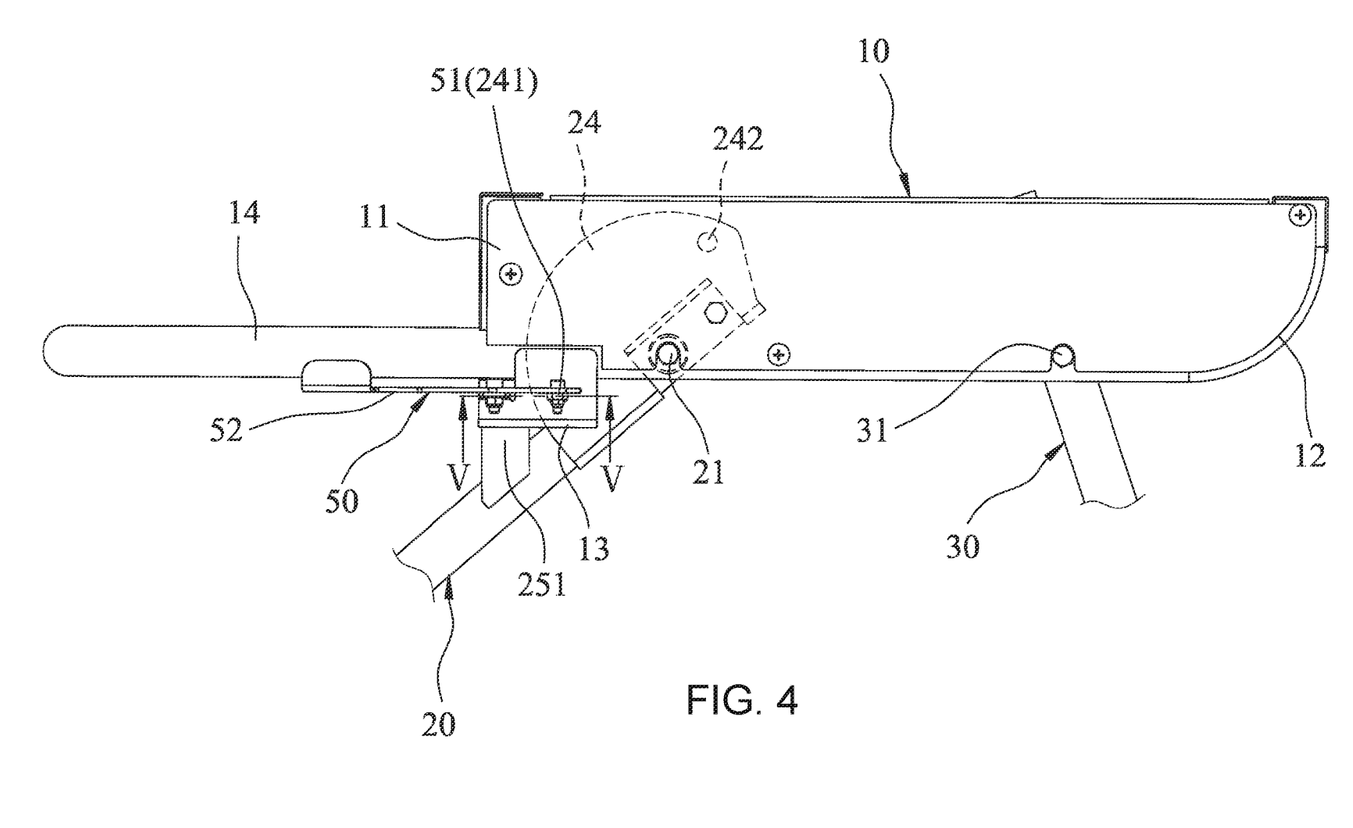
FIG. 4 is a schematic front plain view of the present invention, illustrating the collapsible stand in the extended position.

As illustrated in FIG. 1, FIG. 2 and FIG. 4, the collapsible stand is shown in an extended position. At this time, the first support frame unit 20 and the second support frame unit 30 are respectively and downwardly outwardly extended from the bottom side of the carrying member 10; the first end piece portion 23 of the first support frame unit 20 is disposed at a lower outer side relative to the first lateral portion 11 of the carrying member 10; the second end piece portion 33 of the second support frame unit 30 is disposed a lower outer side relative to the second lateral portion 12 of the carrying member 10; the first end piece portion 23 is kept far from the second end piece portion 33. Referring also to the solid line shown in FIG. 5, inserting the pin 511 of the locking member 51 into the first retaining hole 241 can lock the first support frame unit 20 to the carrying member 10, at this time, the second support frame unit 30 is prohibited from displacement relative to the carrying member 10 subject to the constraint of the links 41 of the linking unit 40, and thus, the collapsible stand is held in an extended position. By means of stopping the stop blocks 251 against the bottom side of the first lateral portion 11, the supporting stability of the first support frame unit 20 relative to the carrying member 10 is enhanced.

When converting the stand from the extended position as shown in FIG. 1 and FIG. 2 to the collapsed position, g, the user can lift the second lateral portion 12 of the carrying member 10 to move the bottom frame bar 37 upwardly from the floor, at this time, the extended collapsible stand can be moved from place to place conveniently with the wheels 27.

When collapsing the collapsible stand, the user can bias the operating end portion 523 of the operating bar 52 of the locking unit 50 to move the pin 511 out of the first retaining hole 241 of the engagement plate 24 (see the imaginary lines in FIG. 3 and FIG. 5) and to force the retainer ring 512 against the elastic restoring end portion 531 of the spring member 531, thereby compressing the spring member 531 to store elastic restoring energy. At this time, the user can lift the handlebar 14 to let the bottom frame bar 37 be stopped against the floor and to bias the carrying member 10 relative to the second support frame unit 30, and at the same time, subject to the effect of the links 41 of the linking unit 40 that are respectively pivotally connected between the first interlocking portion 22 of the first support frame unit 20 and the second interlocking portion 32 of the second support frame unit 30, the first support frame unit 20 is biased relative to the carrying member 10 to move the first end piece portion 23 toward the second support frame unit 30 to the extent that the first end piece portion 23 is disposed in proximity to the second end piece portion 33, and thus, the collapsible stand is held in a collapsed position (see FIG. 6 and FIG. 7). When biasing the first support frame unit 20 relative to the carrying member 10. The engagement plate 24 is turned about the first pivot-connection portion 21. Once the first end piece portion 23 is received to the second support frame unit 30, the second retaining hole 242 is aimed at the pin 511, enabling the pin 511 of the locking member 51 to be forced by the elastic restoring energy of the spring member 53 into the second retaining hole 242 to lock the first support frame unit 20 and the second support frame unit 30 to the carrying member 10. Thus, the dimension of the folded collapsible stand is minimized, saving storage space.

Figure 6:
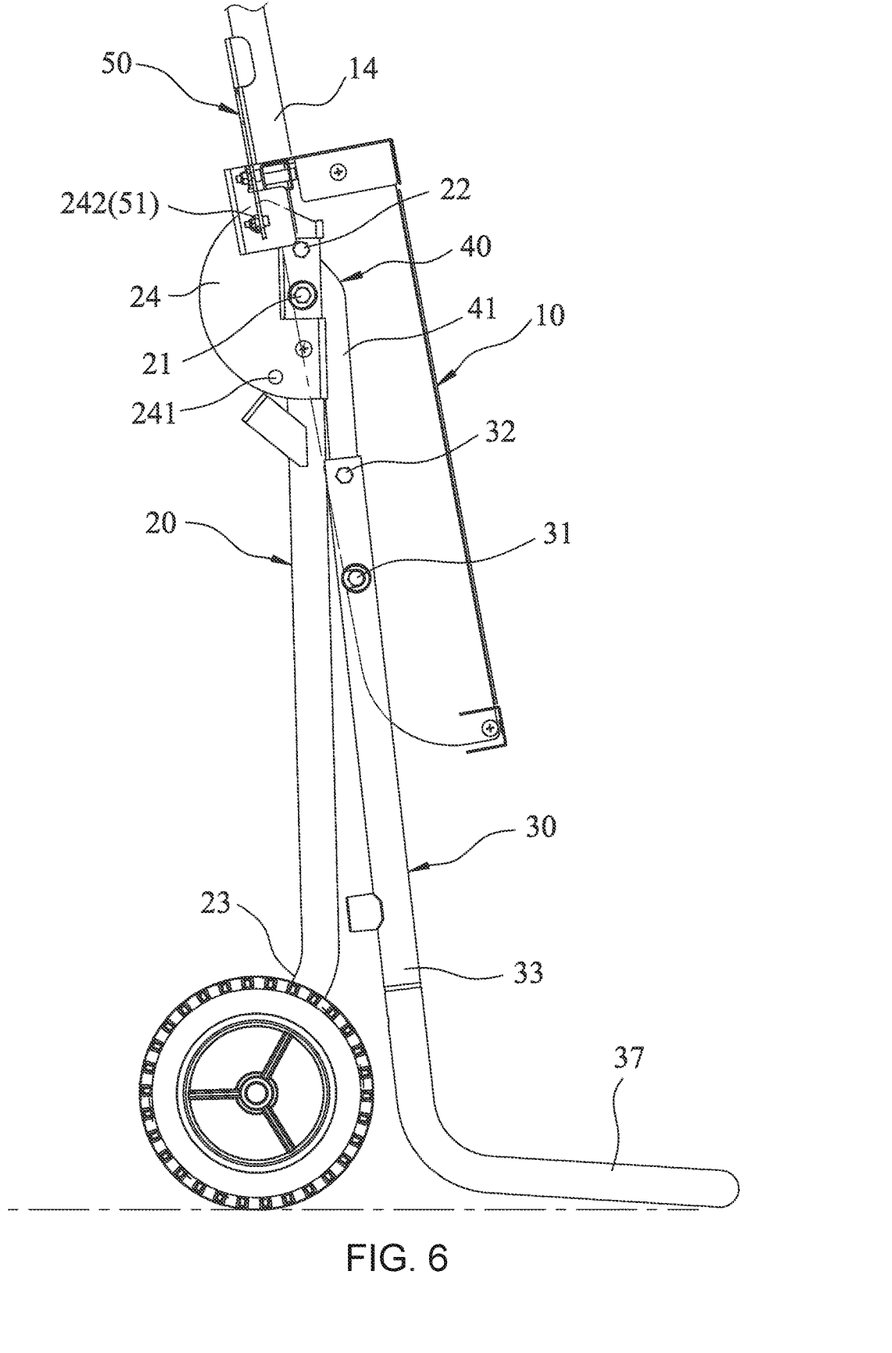
FIG. 6 is a schematic side view of the present invention, illustrating the collapsible stand set in the collapsed position.
Figure 7:
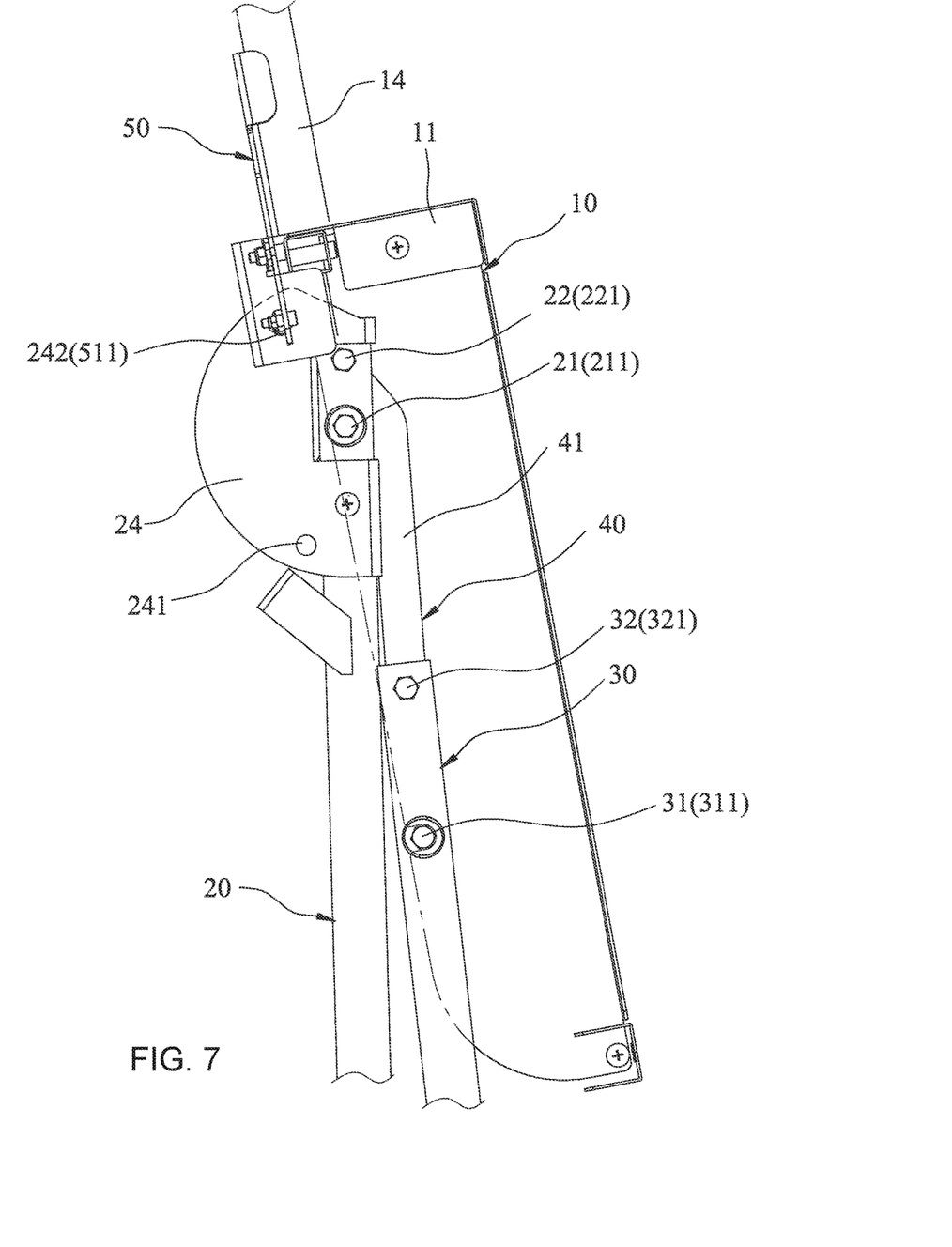
FIG. 7 is an enlarged view of a part of FIG. 6.

When wishing to extend the collapsible stand from the collapsed position shown in FIG. 6 and FIG. 7 to the extended position shown in FIG. 1 and FIG. 2, the operator can bias the operating end portion 523 of the operating bar 52 again to move the pin 511 out of the second retaining hole 242, and then pull the handlebar 14 downwards to bias the carrying member 10 received to the second support frame unit 30, causing the first end piece portion 23 of the first support frame unit 20 to be turned outwardly in direction away from the second end piece portion 33 subject to the linking effect of the linking unit 40. When the collapsible stand reaches the extended position, the engagement plate 24 is moved with the first support frame unit 20 to the position where the first retaining hole 241 is kept in alignment with the pin 511 of the locking member 51, allowing the pin 511 of the locking member 51 to be forced by the elastic restoring energy of the spring member 53 into the first retaining hole 241 to lock the first support frame unit 20 and the second support frame unit 30 to the carrying member 10, and thus, the collapsible stand is held in the extended position, as illustrated by the solid lines shown in FIGS. 1-5.

In conclusion, the collapsible stand of the present invention can be selectively set in the extended position for application or the collapsed position to reduce space occupation according to requirements. Further, the overall structure of the collapsible stand is simple, facilitating manufacturing and assembling. When the collapsible stand is held in the extended position, the distance between the first end piece portion 23 and the second end piece portion 33 is larger than the length of the carrying member 10 between the first lateral portion 11 and the second lateral portion 12, thus, the first support frame unit 20 and the second support frame unit 30 provide a large area support to the carrying member 10, assuring high stability and eliminating the drawbacks of conventional designs.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A collapsible stand, comprising:
a carrying member comprising a first lateral portion and an opposing second lateral portion;
a first support frame unit comprising a first pivot-connection portion pivotally connected to said carrying member adjacent to said first lateral portion, a first interlocking portion located at one side of said first pivot-connection portion, and a first end piece portion located at an opposite side of said first pivot-connection portion opposite to said first interlocking portion;
a second support frame unit comprising a second pivot-connection portion pivotally connected to said carrying member adjacent to said second lateral portion, a second interlocking portion located at one side of said second pivot-connection portion, and a second end piece portion located at an opposite side of said second pivot-connection portion opposite to said second interlocking portion;
a linking unit pivotally connected between said first interlocking portion of said first support frame unit and said second interlocking portion of said second support frame unit; and
a locking unit mounted at one of said carrying member, said first support frame unit and said second support frame unit and adapted for locking said first support frame unit and said second support frame unit to said carrying member;
wherein said first support frame unit is operable to move the collapsible stand between an extended position and a collapsed position; when operating said first support frame unit to move the collapsible stand from said collapsed position to said extended position, said linking unit is forced to move said second support frame unit away from said carrying member to said extended position where said first end piece portion and said second end piece portion are kept far away from each other and said locking unit is operable to lock said first support frame unit and said second support frame unit to said carrying member in said extended position;
when operating said first support frame unit to move the collapsible stand from said extended position to said collapsed position, said linking unit is forced to move said second support frame unit toward said carrying member to said collapsed position where said first end piece portion and said second end piece portion are kept in proximity to each other and said locking unit is operable to lock said first support frame unit and said second support frame unit to said carrying member in said collapsed position.

2. The collapsible stand as claimed in claim 1, wherein said first support frame unit further comprises an engagement plate fixedly located at one side of said first pivot-connection portion, said engagement plate comprising a first retaining hole located at one side of said first pivot-connection portion and a second retaining hole located at an opposite side of said first pivot-connection portion opposite to said first retaining hole; said locking unit comprises a locking member movable relative to said carrying member, said locking member being insertable into said first retaining hole to lock the collapsible stand in said extended position, and insertable into said second retaining hole to lock the collapsible stand in said collapsed position.

3. The collapsible stand as claimed in claim 2, wherein said carrying member comprises a mount located at said first lateral portion, said mount comprising a bottom panel, two opposite side panels respectively vertically connected to two opposite lateral sides of said bottom panel and a lug connected to one said side panel, each said side panel comprising a pivot hole for the insertion of said locking member; said locking unit further comprises an operating bar pivotally connected to said lug and a spring member mounted on said locking member, said operating bar comprising a body portion pivotally connected to said lug of said mount, a connection end portion located at one end of said body portion and connectable to said locking member and an operating end portion located at an opposite end of said body portion opposite to said connection end portion, said spring member being disposed between said two side panels and comprising an elastic restoring end portion located at one end thereof and connected to said locking member and an abutment end portion located at an opposite end thereof opposite to said elastic restoring end portion and abutted against one said side panel, said spring member being adapted for providing an elastic restoring energy to move said locking member constantly toward said engagement plate.

4. The collapsible stand as claimed in claim 3, wherein said carrying member further comprises a handlebar connected to said first lateral portion; said operating end portion of said operating bar of said locking unit is disposed in proximity to said handlebar.

5. The collapsible stand as claimed in claim 1, wherein said first support frame unit comprises a pair of first frame bars respectively extended from said first pivot-connection portion to said first end piece portion, a cross bar connected between said two first frame bars and a pair of wheels respectively pivotally mounted at respective bottom ends of said first frame bars; said first pivot-connection portion comprises a pair of first pivot bolts respectively connected to respective opposing top ends of the first frame bars; said first interlocking portion comprises a pair of first interlocking bolts respectively located at the top ends of said first frame bars and respectively connected to said first pivot bolts of said first pivot-connection portion; said first end piece portion comprises a pair of first wheel axles disposed opposite to said first interlocking bolts at an opposite side relative to said first pivot bolts; said wheels are respectively pivotally mounted on said first wheel axles.

6. The collapsible stand as claimed in claim 5, wherein said second support frame unit further comprises a pair of second frame bars respectively extended from said second pivot-connection portion to said second end piece portion, a second cross bar connected between said second frame bars, and an inverted-U-shaped bottom frame bar connected between said second frame bars; said second pivot-connection portion comprises a pair of second pivot bolts respectively connected to said second frame bars; said second interlocking portion comprises a pair of second interlocking bolts respectively connected to said second pivot bolts of said second pivot-connection portion; said second end piece portion comprises a pair of connection end holes disposed opposite to said second interlocking bolts at an opposite side relative to said second pivot bolts; said bottom frame bar has two opposite ends thereof respectively connected to said connection end holes of said second end piece portion; said linking unit comprises a pair of links respectively pivotally connected between said first interlocking portion and said second interlocking portion, said links being respectively pivotally connected between said first interlocking bolts and said second interlocking bolts.

7. The collapsible stand as claimed in claim 5, wherein said first frame bars of said first support frame unit each comprise a stop block respectively disposed between said first pivot bolts and said first wheel axles, said stop blocks of said first support frame unit being respectively stopped at a bottom side of said first lateral portion when the collapsible stand is set in said extended position.

\* \* \* \* \*